(12) United States Patent
Han et al.

(10) Patent No.: US 7,760,321 B2
(45) Date of Patent: Jul. 20, 2010

(54) METHOD OF MANUFACTURING A LIQUID CRYSTAL DISPLAY DEVICE

(75) Inventors: Mi-jung Han, Gyeonggi-do (KR); Jeong-ye Choi, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 665 days.

(21) Appl. No.: 11/675,377

(22) Filed: Feb. 15, 2007

(65) Prior Publication Data
US 2007/0195240 A1  Aug. 23, 2007

(30) Foreign Application Priority Data
Feb. 20, 2006  (KR) ...................... 10-2006-0016201

(51) Int. Cl.
*G02F 1/13* (2006.01)
*G02F 1/1335* (2006.01)
(52) U.S. Cl. .................. 349/187; 349/113; 349/114
(58) Field of Classification Search ......... 349/113–114, 349/187
See application file for complete search history.

(56) References Cited

U.S. PATENT DOCUMENTS

2004/0141113 A1  7/2004  Yun

FOREIGN PATENT DOCUMENTS

| CN | 1117594 A | 2/1996 |
|---|---|---|
| CN | 121379 A | 3/1999 |
| CN | 1361445 A | 7/2002 |
| CN | 1442731 A | 9/2003 |
| CN | 1480772 A | 3/2004 |
| JP | 2001-033606 | 2/2001 |
| JP | 2001-038536 A | 3/2001 |
| JP | 2002-049031 | * 2/2002 |
| JP | 2004191417 A | 7/2004 |
| JP | 2005078005 A | 3/2005 |
| KR | 10-2003-52093 | 6/2003 |

OTHER PUBLICATIONS

English Language Abstract, JP Patent First Publication No. 2001-033606, Feb. 9, 2001, 1 page.
English Language Abstract, JP Patent First Publication No. 2002-049031, Feb. 15, 2002, 1 page.
English Language Abstract, KR Patent First Publication No. 10-2003-52093, Jun. 26, 2003, 1 page.

* cited by examiner

*Primary Examiner*—Andrew Schechter
*Assistant Examiner*—Charles Chang
(74) *Attorney, Agent, or Firm*—Innovation Counsel LLP

(57) ABSTRACT

A method of manufacturing a liquid crystal display device, comprises depositing a first fluid composition on an insulating substrate using an inkjet deposition process to form a first lens sub-portion, said first fluid composition comprising a first liquid resin; hardening the first lens sub-portion; depositing a second fluid composition on the insulating substrate using the inkjet deposition process to form a second lens sub-portion, said second fluid composition comprising a second liquid resin; hardening the second lens sub-portion to form a lens portion comprising the first lens sub-portion and the second lens sub-portion; and forming a reflective film over the lens portion. A method of manufacturing a liquid crystal display device is provided which can simplify the formation of a lens portion.

20 Claims, 18 Drawing Sheets

METHOD OF MANUFACTURING A LIQUID CRYSTAL DISPLAY DEVICE

CROSS-REFERENCE TO RELATED APPLICATIONS

This application claims priority from Korean Patent Application No. 10-2006-0016201, filed on Feb. 20, 2006, in the Korean Intellectual Property Office, the disclosure of which is incorporated herein by reference.

BACKGROUND

1. Field of Invention

The present invention relates to a method of manufacturing a liquid crystal display device, and more particularly, to a method of manufacturing a liquid crystal display device including a reflective area formed with a lens portion.

2. Description of the Related Art

Generally, a liquid crystal display device includes a liquid crystal display panel. The liquid crystal display panel includes a lower substrate, an upper substrate, and a liquid crystal layer interposed therebetween.

The liquid crystal display device can be classified as a transmissive type, a reflective type, or a transflective type, depending on the type of light source used. A transmissive liquid crystal display device includes a back light unit disposed behind the liquid crystal display panel, which produces light which is transmitted through the liquid crystal display panel. A reflective liquid crystal display device utilizes natural light so as to eliminate the need for the back light unit which typically accounts for about 70% of the total power consumption of the liquid crystal display device. As a result, power consumption can be reduced. A transflective liquid crystal display device utilizes advantages of the transmissive liquid crystal display device and the reflective liquid crystal display device by using both natural light and a back light unit. Accordingly, the transmissive liquid crystal display device can provide a proper brightness despite changes in the brightness of the operating environment.

The reflective liquid crystal display device and the transflective liquid crystal display device include a reflective film to reflect light entering from outside the display device. The reflective film should have a proper anisotropic scattering characteristic. Therefore, the reflective film is formed on a portion of the lens made of an organic film.

However, since the lens portion is manufactured by a complicated process of coating, exposing, developing, and reflowing an organic film, the manufacturing process thereof takes a long time.

SUMMARY

Accordingly, it is an aspect of the present invention to provide a method of manufacturing a liquid crystal display device, which can simplify the formation of the lens.

The foregoing and/or other aspects can be achieved by providing a method of manufacturing a liquid crystal display device, comprising: depositing a first fluid composition on an insulating substrate using an inkjet deposition process to form a first lens sub-portion, said first fluid composition comprising a first liquid resin; hardening the first lens sub-portion; depositing a second fluid composition on the insulating substrate using an inkjet deposition process to form a second lens sub-portion, said second fluid composition comprising a second liquid resin; hardening the second lens sub-portion to form a lens portion comprising the first lens sub-portion and the second lens sub-portion; and forming a reflective film over the lens portion.

According to the embodiment of the present invention, the first liquid resin and the second liquid resin each comprise a UV hardening resin, and the first and second lens sub-portions are hardened by applying an ultraviolet ray thereto.

According to the embodiment of the present invention, the method further comprises forming a hydrophobic layer over the insulating substrate before forming the first lens sub-portion forming, wherein the lens portion is in direct contact with the hydrophobic layer.

According to the embodiment of the present invention, the hydrophobic layer comprises at least one of a silicon based compound and a fluorine based compound.

According to the embodiment of the present invention, the lens portion has a dot pattern and a hemispheric shape. The lens portion may have a stripe pattern.

According to the embodiment of the present invention, the lens portion is disposed in parallel with a row direction and column direction. The lens portion may be disposed in parallel only a row direction.

According to the embodiment of the present invention, the first fluid composition and the second fluid composition have the same compositions.

The foregoing and/or other aspects of the present invention can be achieved by providing a method of manufacturing a liquid crystal display device comprising a transmissive area and a reflective area, comprising: forming a first lens sub-portion by jetting a first fluid composition comprising a first liquid resin over the reflective area; hardening the first lens sub-portion; forming a second lens sub-portion by jetting a second fluid composition comprising a second liquid resin between the first lens sub-portions; forming a lens portion by hardening the second lens sub-portion; and forming a reflective film over the lens portion.

According to the embodiment of the present invention, the method further comprises forming a hydrophobic layer before forming the lens portion forming.

According to the embodiment of the present invention, the method further comprises forming a switching element and a hydrophobic layer before forming the lens portion. According to the embodiment of the present invention, the method comprises forming a transparent conductive layer connected to the switching element. The hydrophobic layer is formed before forming the switching element.

The hydrophobic layer may be formed after forming the switching element. The switching element comprises a source electrode and a drain electrode which are contacted to the hydrophobic layer.

According to the embodiment of the present invention, the hydrophobic layer is formed over the reflective area and the transmissive area.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

DETAILED DESCRIPTION

Figure 1:
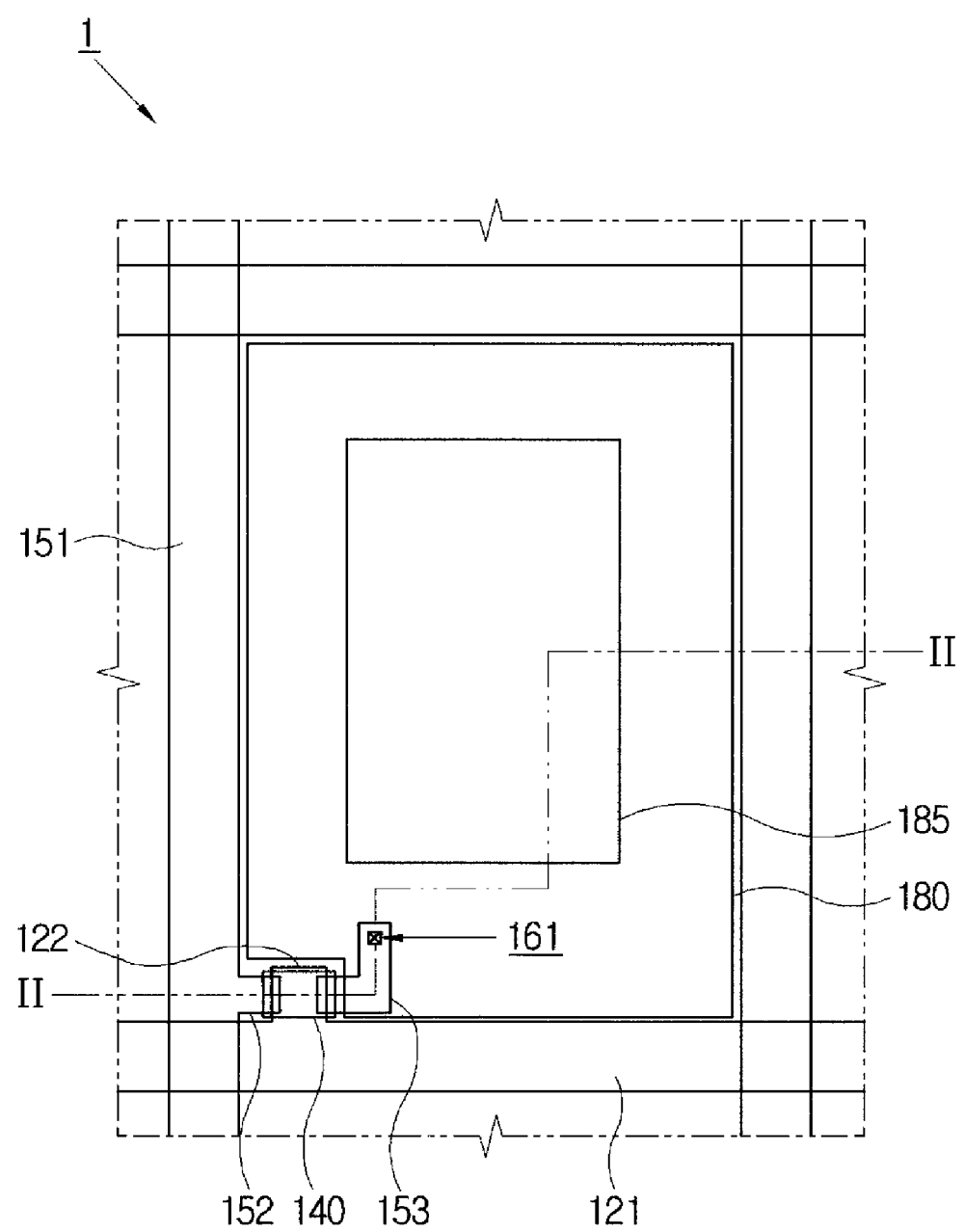
FIG. 1 illustrates a pixel of liquid crystal display device manufactured by a manufacturing method according to a first embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

Hereinafter, a transflective type liquid crystal display device will representatively described, but the present invention is not limited thereto and may be applied to a reflective type liquid crystal display device.

Figure 2:
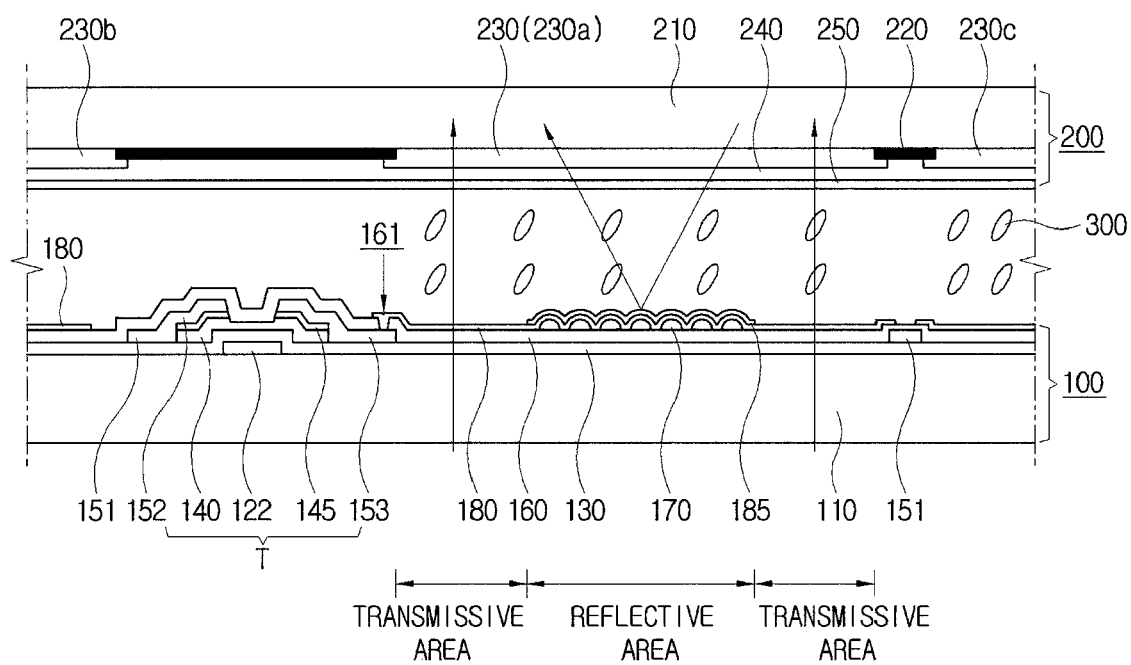
FIG. 2 is a sectional view of the liquid crystal display device taken along line II-II in FIG. 1.
Figure 3:
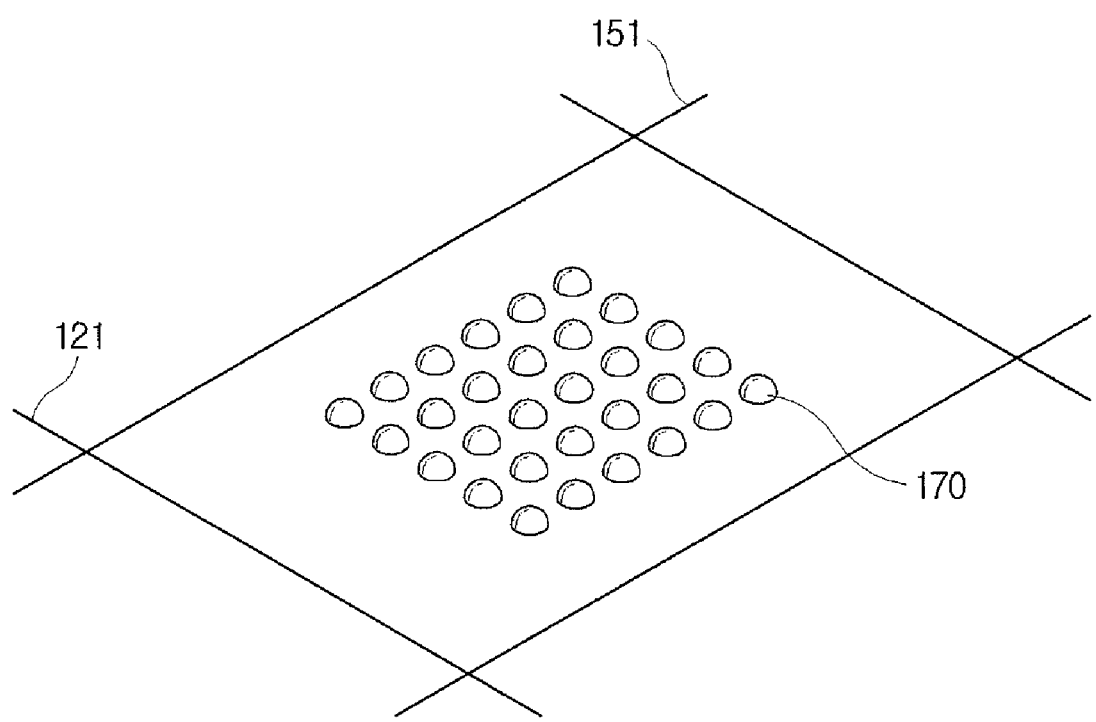
FIG. 3 illustrates a lens portion of the liquid crystal display device according to the first embodiment of the present invention.

As shown in FIGS. 1 to 3, a liquid crystal display device manufactured by a manufacturing method according to a first embodiment of the present invention includes a lower substrate 100, an upper substrate 200 facing the lower substrate 100, and a liquid crystal layer 300 interposed therebetween.

In the lower substrate 100, a gate line 121 is formed over a first insulating substrate 110. The gate line 121 extends horizontally (as depicted in FIG. 1). A gate electrode 122 is connected to the gate line 121.

A gate insulation film 130 formed of silicon nitride (SiNx) covers the gate line 121 and gate electrode 122.

A semiconductor layer 140 comprising a semiconductor such as amorphous silicon is formed over the gate insulation film 130, and an ohmic contact layer 145 is comprising a material such as a hydrogenated n+ amorphous silicon doped with an n-type impurity or silicide of high density is formed over the semiconductor layer 140. The ohmic contact layer 145 in a channel portion between a source electrode 152 and a drain electrode 153 is removed.

A data line 151, a source electrode 152 and a drain electrode 153 are formed over the ohmic contact layer 145 and the gate insulation film 130. The data line 151 extends vertically (as depicted in FIG. 1) and intersects the gate line 121 to define a pixel. The source electrode 152 branching from the data line 151 extends over the ohmic contact layer 145 and the drain electrode 153 separated from the source electrode 152 is formed over the ohmic contact layer 145.

A passivation layer 160 is formed over the data line 151, the source electrode 152, the drain electrode 153, and the portion of the semiconductor layer 140 exposed between the source electrode 152 and drain electrode 153. A contact hole is formed in the passivation layer 160 to expose a portion of the drain electrode 153. The passivation layer 160 may be formed of silicon nitride (SiNx). A lens portion 170 is formed in a central area of the pixel. The lens portion 170 is formed directly on and contacts the passivation layer 160, and the region in which the lens portion 170 is formed corresponds to that of a reflective film 185 (described below).

As shown in FIG. 3, the lens portion 170 comprises a plurality of protrusions formed in an array of rows and columns. The lens portion 170 is formed of a thermosetting resin, an ultraviolet (UV) hardening resin or an electron beam hardening resin. These resins are hardening resins which are hardened through a cross linking reaction when heat, an ultraviolet ray or an electron beam is applied thereto.

For example, the UV hardening resin may be an acryl urethane series resin, a UV hardening polyester acrylate series resin, a UV hardening epoxy acrylate series resin, a UV hardening polyol acrylate series resin, or a UV hardening epoxy resin.

The lens portion 170 may include a photopolymerization initiator which activates the polymerization or cross linking reaction when the ultraviolet ray is applied.

The protrusions of the lens portion 170 may have a hemispheric shape so that the reflective film 185 positioned over the lens portion 170 can provide a suitable anisotropic scattering characteristic. The diameter of each hemispherical protrusion of the lens portion 170 may be approximately 10 μm. If the scattering provided by the reflective film 185 is excessive, the light absorption of a color filter 230 increases such that an image on the display panel may be darkened. If the scattering provided by the reflective film 185 is insufficient, the reflected light is concentrated in a certain direction, thereby resulting in a narrow viewing angle. Also, the liquid crystal display device includes a plurality of layers having different refractive indexes. Thus, if the angle of light reflected by the reflective film 185 is greater than a critical angle, the light will not be reflected back out of the liquid crystal display device.

However, when the reflective film 185 of the lens portion 170 is formed with a hemispheric shape having a proper anisotropic scattering characteristic, high brightness and wide viewing angle can be achieved.

The lens portion 170 is formed by an inkjet deposition process to deposit a thermosetting resin, a UV hardening resin or an electron beam hardening resin on the passivation layer 160.

A pixel electrode 180 is formed over the passivation layer 160 and the lens portion 170. The pixel electrode 180 is formed of a transparent conductive material such as ITO (indium tin oxide) or IZO (indium zinc oxide). The pixel electrode 180 is connected to the drain electrode 153 through the contact hole 161.

The reflective film 185 is formed over the pixel electrode 180 in a region corresponding to the lens portion 170. The reflective film 185 may be formed of metal with high reflectiveness, such as aluminum, silver, or an alloy of aluminum and molybdenum. Since the reflective film 185 is formed over the protrusions forming the lens portion 170, the reflective film 185 has an uneven upper surface corresponding to the shape of protrusions of the lens portion 170. A pixel area 1 includes a reflective area in which the reflective film 185 is formed and a transmissive area surrounding the reflective area.

The upper substrate 200 will be described.

A black matrix 220 is formed over the upper substrate 200. The black matrix 220 partitions off the color filters 230a, 230b and 230c, and covers the portion of the pixel area 1 corresponding to the thin film transistor T positioned over the lower substrate 100. The black matrix 220 may comprise an organic photoresist containing a black pigment. The black pigment may be formed of carbon black or titanium oxide.

The color filter 230 includes a red filter 230a, a green filter 230b, and a blue filter 230c. The three color filters 230a-230c are repeatedly formed within the boundaries of defined by the black matrix 220. The color filter 230 provides color to light emitted from a backlight unit (not shown) or light reflected by the reflective film 185. The color filter 230 is formed of an organic photoresist.

An overcoating layer 240 is formed over the color filter 230 and the portions of black matrix 220 not covered by the color filter 230. The overcoating layer 240 may comprise acryl series epoxy and is used to planarize the surface of the upper substrate 200 and to protect the color filter 230.

A common electrode 250 is formed over the overcoating layer 240. The common electrode 250 is formed of a transparent conductive material such as ITO (indium tin oxide) or IZO (indium zinc oxide). The common electrode 250 and the pixel electrode 180 cooperate to supply a voltage across the liquid crystal layer 300.

The liquid crystal display device is provided as a transflective type including reflective areas and transmissive areas. Hereinafter, the flow of light in the liquid crystal display device will be described.

Light emitted from the transmissive area is generated by the backlight unit and passes through the lower substrate 100, the liquid crystal layer 300, and the upper substrate 200 before being emitted from the liquid crystal display device. After the light is passes through the lower substrate 100, the amount of light transmitted through the liquid crystal layer 300 is adjusted. When the light is transmitted through the color filter 230, the light is provided with color. Light emitted from the backlight unit to the reflective area is reflected by the reflective film 185 and returns to the backlight unit, where the light is reflected back towards the liquid crystal layer 300.

Light entering the display device through the upper substrate 200 in the region corresponding to the reflective area is reflected by the reflective film 185, thereby causing the light to be emitted through the upper substrate 200 back out of the display device. In the liquid crystal display device, the transmissive area surrounds the reflective area. In other embodiments, the reflective area may surround the transmissive area. In yet other embodiments, the pixel electrode 180 may be not formed in the reflective area. Here, the pixel electrode 180 should be electrically connected with the reflective film 185 so that the reflective film 185 may also conduct the data voltage conducted by the pixel electrode 185.

Hereinafter, the manufacturing method of the liquid crystal display device according to the first embodiment of the present invention will be described with reference to FIGS. 4 to 7.

Figure 4:
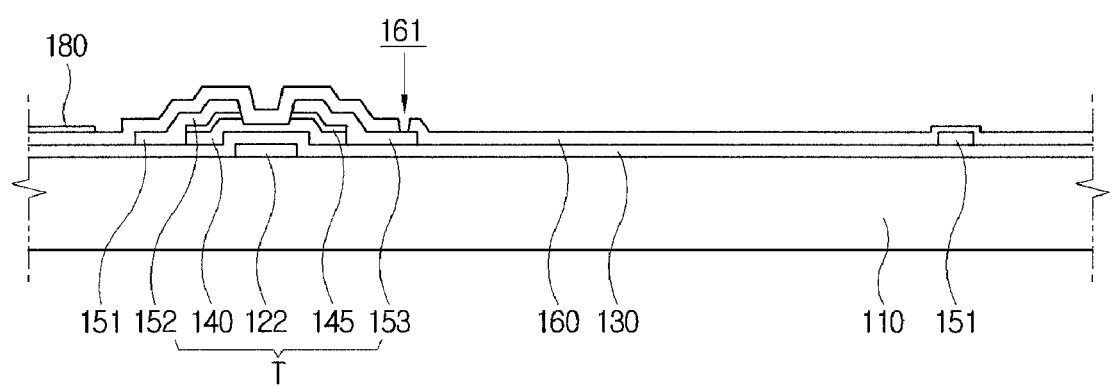
FIGS. 4 to 7 illustrate the manufacturing method of the liquid crystal display device according to the first embodiment of the present invention.

Referring to FIG. 4, the thin film transistor T, the gate insulation film 130, the data line 151, and the passivation layer 160 are formed over the first insulating substrate 110. The contact hole 161 is formed in the passivation layer 160 to expose the drain electrode 153. This manufacturing method can be achieved by well-known methods, and thus detailed description thereof will be omitted.

Figure 5:
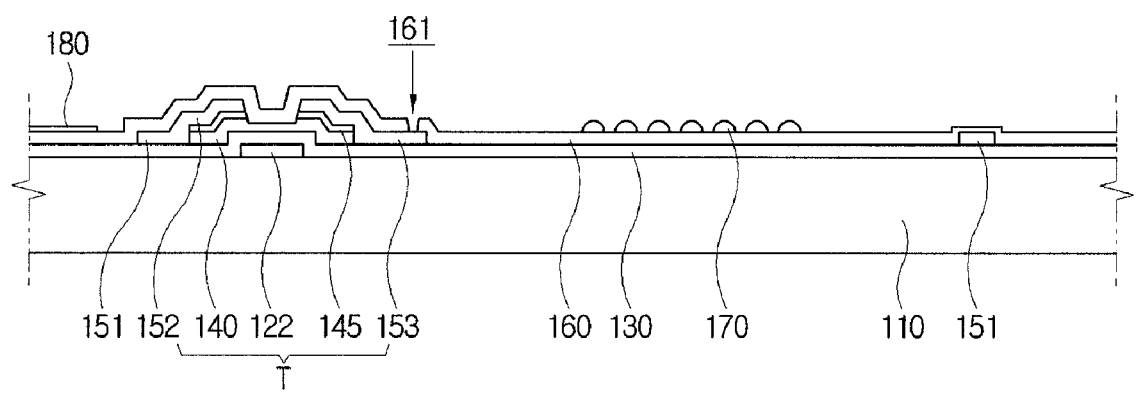

Referring to FIG. 5, the lens portion 170 is formed over the passivation layer 160 in the reflective area.

Figure 6A:
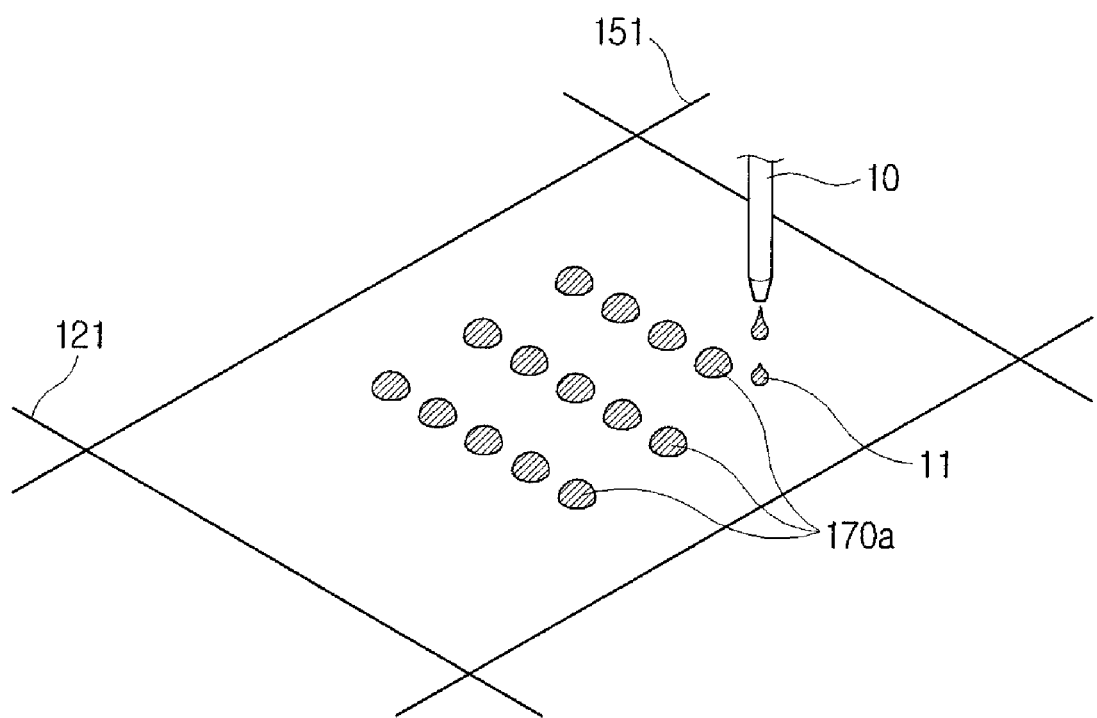

Referring to FIG. 6A, a first lens sub-portion 170a is formed by ejecting a first fluid composition 11 through an inkjet nozzle 10. The first lens sub-portion 170a comprises a plurality of protrusions formed at a predetermined interval in a plurality of rows. The first fluid composition 11 includes a first liquid resin, e.g., a UV hardening resin, and may further include a solvent. The solid content of the first fluid composition 11 may be approximately 30%, and the viscosity of the fluid composition 11 may be, e.g., 20 to 30 cP. The volume of each protrusion forming the first lens sub-portion 170a may be approximately 2 to 6 picoliters.

The first fluid composition 11 is polarized, and the passivation layer 160 formed of silicon nitride (SiNx) is hydrophobic. Thus, since the surface energy between the first lens sub-portion 170a and the passivation layer 160 is low, a dewetting phenomenon happens. Accordingly, the dewetting phenomenon causes each protrusion in the first lens sub-portion 170a not to spread but to maintain a hemispheric shape.

Figure 6B:
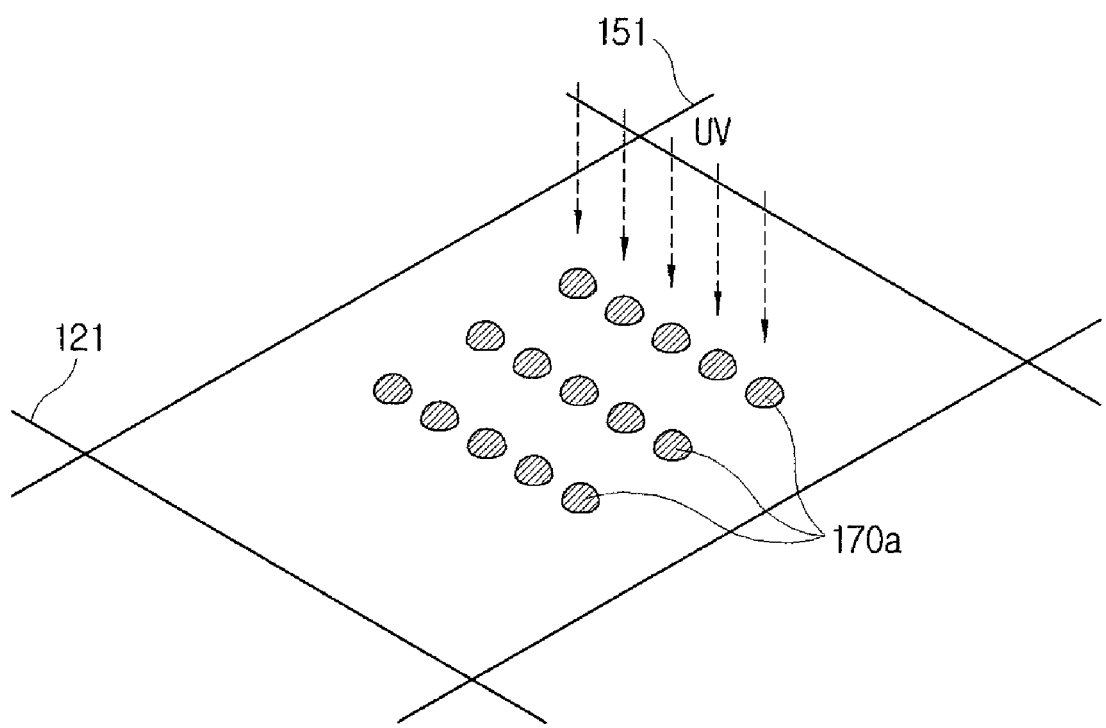

Then, referring to FIG. 6B, the ultraviolet ray is applied to the first lens sub-portion 170a to harden the protrusions forming the first lens sub-portion 170a. Thus, the first lens sub-portion 170a is formed on the passivation layer 160.

Figure 6C:
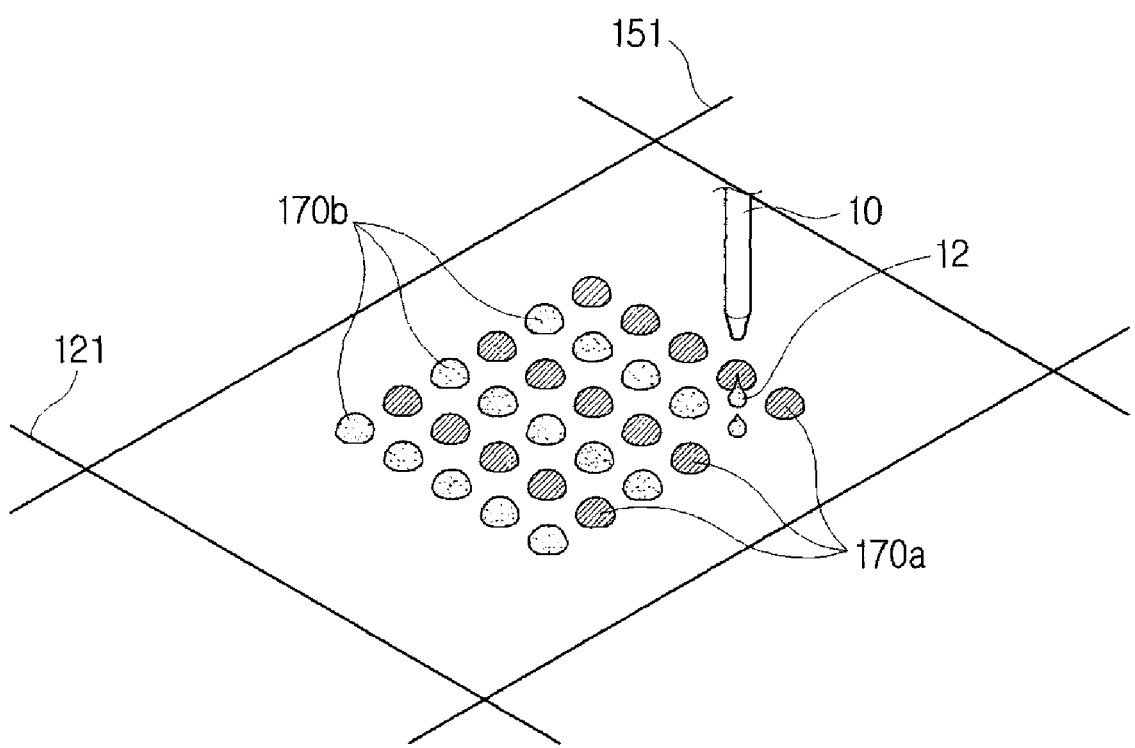

Then, referring to FIG. 6C, a second lens sub-portion 170b is formed by ejecting a second fluid composition 12 between the protrusions of the first lens sub-portion 170a. The second fluid composition 12 includes a second liquid resin, e.g., a UV hardening resin, and may further include a solvent. The solid content of the second fluid composition 12 may be approximately 30%, and the viscosity of the fluid composition 11 may be, e.g., 20 to 30 cP. The volume of each protrusion in the second lens sub-portion 170b may be approximately 2 to 6 picoliters. The first fluid composition 11 and the second fluid composition 12 have the same compositions and size.

Since the first lens sub-portion 170a is hardened before the second lens sub-portion 170b is deposited between the protrusions of the first lens sub-portion, the protrusions of the first lens sub-portion 170a and the second lens sub-portion 170b do not mix together.

Figure 6D:
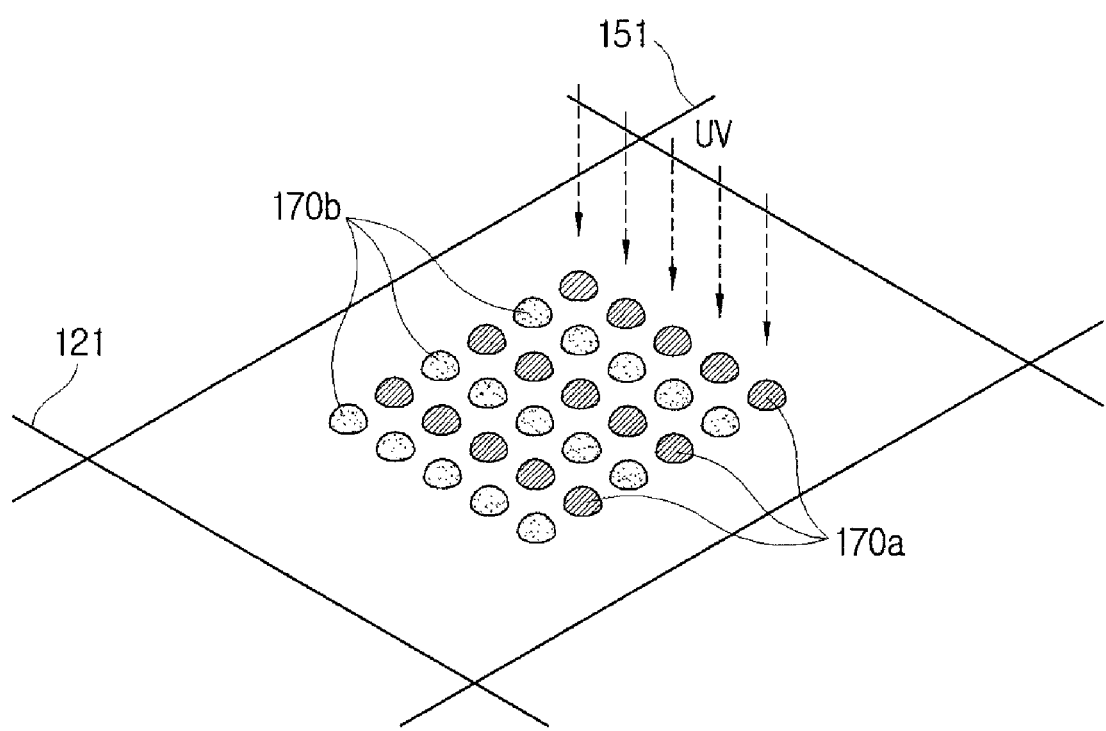

Then, referring to FIG. 6D, the ultraviolet ray is applied to the second lens sub-portion 170b to harden the protrusions forming the second lens sub-portion 170b. Thus, the second lens sub-portion 170b is formed on the passivation layer 160. The first lens sub-portion 170a and the second lens sub-portion 170b together form the lens portion 170.

Accordingly, the manufacturing method of the liquid crystal display device according to the first embodiment of the present invention can be used to easily form the lens portion 170 without utilizing exposing and developing processes. In addition, the use of the fluid compositions 11 and 12 may be minimized because most of the droplet-deposited fluid compositions 11 and 12 can be used to form the lens portion 170 and are not wasted due to subsequent removal during the manufacturing process, as would be the case with lithographically formed protrusions.

In this embodiment, the lens portion 170 is made by applying the inkjet deposition process and the curing process separately for two sub-portions of the lens portion 170, the first lens sub-portion 170a and the second lens sub-portion 170b. Alternatively, the lens portion 170 may be formed using three or more sub-portions, with each sub-portion being formed using separate inkjet deposition processes and curing processes.

Figure 7:
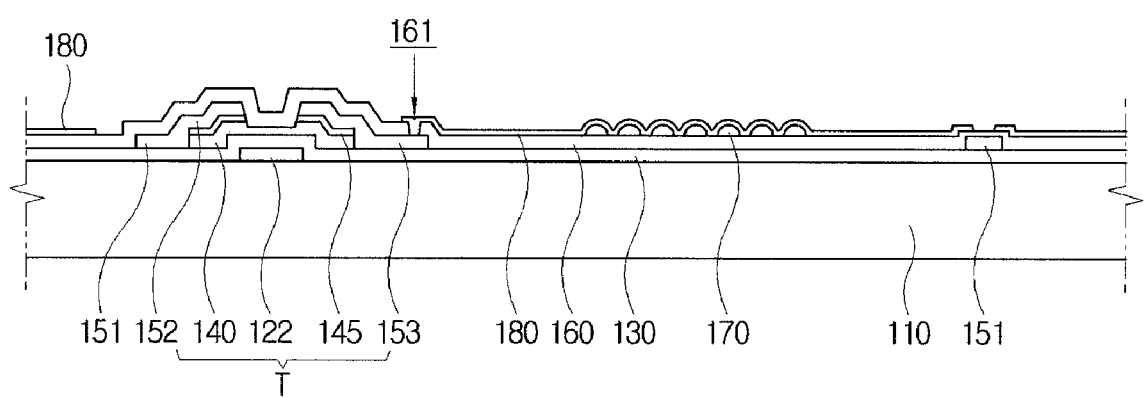

Then, referring to FIG. 7, the pixel electrode 180 is formed over the passivation layer 160 and the lens portion 170. The pixel electrode 180 is connected with the drain electrode 153 through the contact hole 161.

Then, the reflective film 185 is formed over the lens portion 170 by depositing and then patterning a reflective metal layer to complete the lower substrate 100 shown in FIG. 2.

The black matrix 220, the color filter 230, the overcoating layer 240, and the common electrode 250 are formed over the second insulating substrate 210 to form the upper substrate 200. Then, the lower substrate 100 and the upper substrate 200 are coupled together, and liquid crystal is injected therebetween to form the liquid crystal display device.

Hereinafter, liquid crystal display devices manufactured by manufacturing methods according to a second embodiment and a third embodiment of the present invention will be described with reference to FIGS. 8 and 9.

Figure 8:
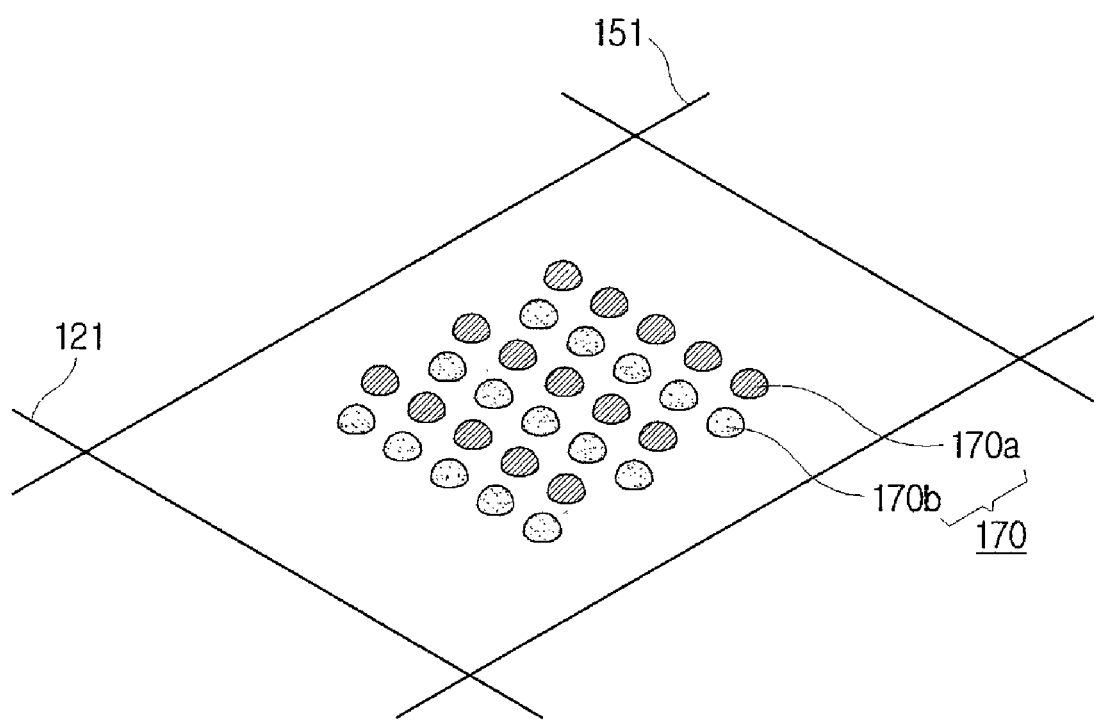
FIG. 8 illustrates a lens portion of a liquid crystal display device manufactured by a manufacturing method according to a second embodiment of the present invention.

As shown in FIG. 8, a liquid crystal display device manufactured by a manufacturing method according to the second embodiment of the present invention includes first and second lens sub-portions 170a and 170b. In this embodiment, the protrusions of the first and second lens sub-portions are disposed in a zigzag pattern relative to each other. In other words, the protrusions of the first lens sub-portion and the protrusions of the second lens sub-portion are disposed parallel rows, but the protrusions of the first and second lens sub-portions do not align in the perpendicular column direction, as shown in FIG. 8. Thus, the columns formed by the protrusions in the first lens sub-portion are offset from the columns formed by the protrusions in the second lens sub-portion. The offset arrangement of protrusions enables the protrusions of the a lens portion 170 to be more densely formed than in the first embodiment, in which the columns formed by the protrusions in the first lens sub-portion align with the columns formed by the protrusions in the second lens sub-portion.

Figure 9:
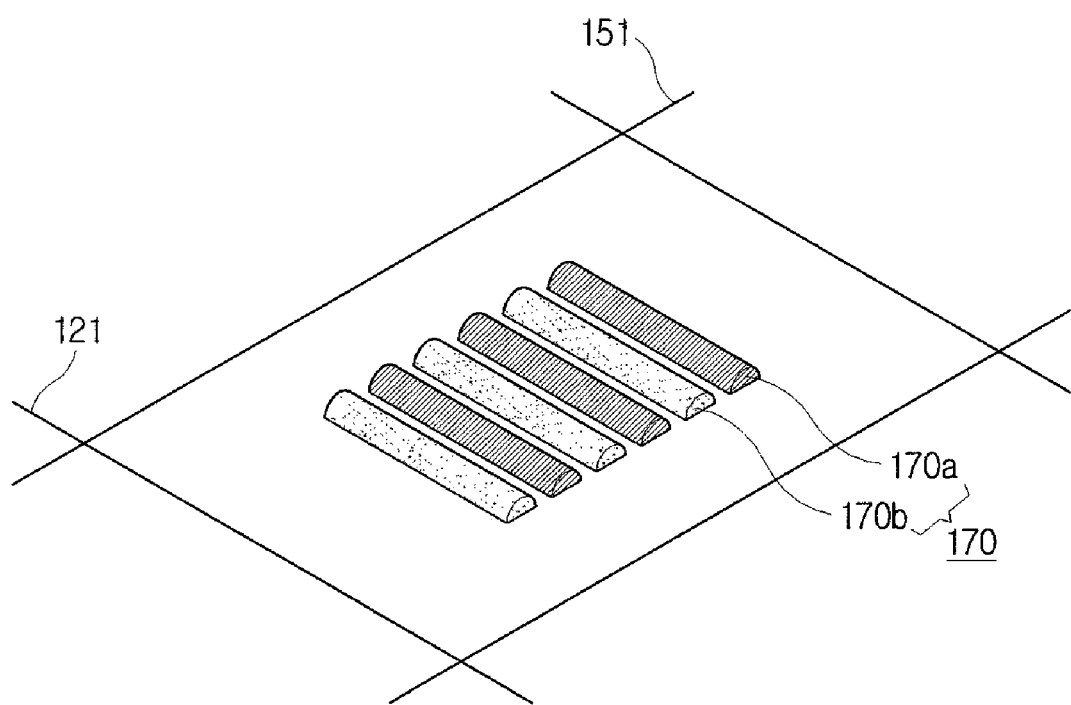
FIG. 9 illustrates a lens portion of a liquid crystal display device manufactured by a manufacturing method according to a third embodiment of the present invention.

As shown in FIG. 9, a liquid crystal display device manufactured by a manufacturing method according to the third embodiment of the present invention includes first and second lens sub-portions 170a and 170b, wherein the first and second sub-portions 170a-170b each comprise a plurality of parallel linear protrusions, instead of the hemispherical protrusions of the first and second embodiments shown in FIGS. 6D and 8. The linear protrusions of the lens portions 170a and 170b are formed parallel to each other and separated by a predetermined distance. The linear protrusions may be a prismatic type, and cross sections thereof each have a semicircular shape.

The first lens sub-portion 170a and the second lens sub-portion 170b according to the first, second, and third embodiments may have the same composition. In other embodiments, shapes and/or compositions of the lens sub-portions may vary.

Hereinafter, a liquid crystal display device manufactured by a manufacturing method according to a fourth embodiment of the present invention will be described with reference to FIGS. 10 to 12.

Figure 10:
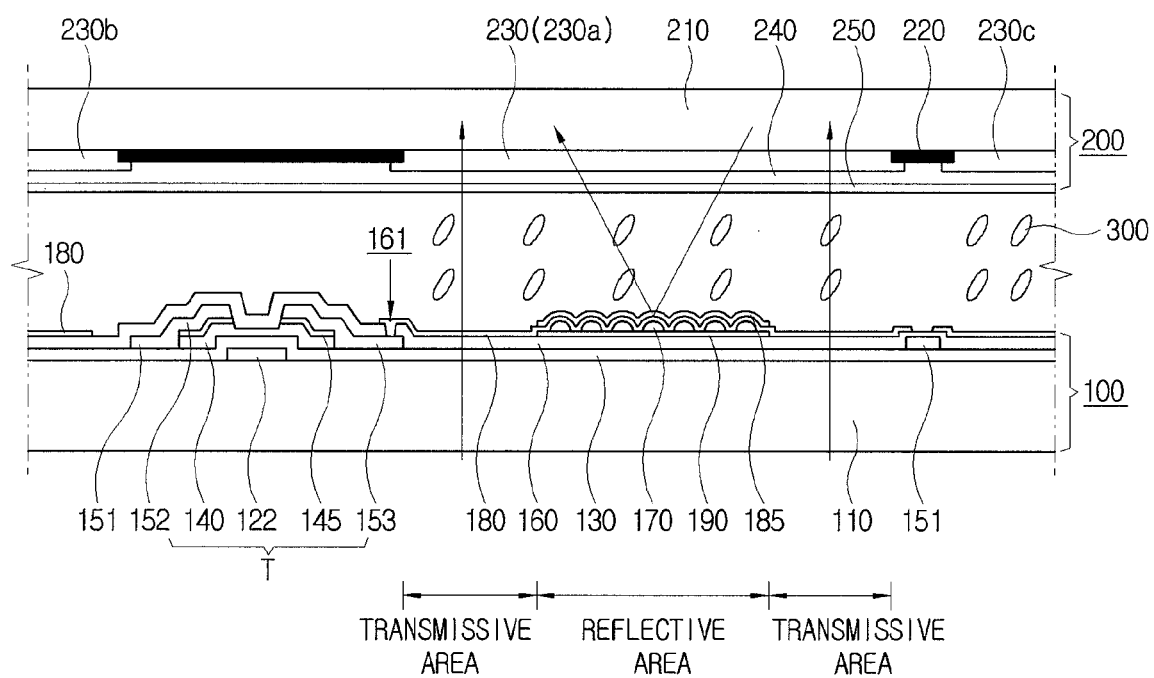
FIG. 10 is a sectional view of a liquid crystal display device manufactured by a manufacturing method according to a fourth embodiment of the present invention.

As shown in FIG. 10, a liquid crystal display device manufactured by a manufacturing method according to the fourth embodiment of the present invention includes a separate hydrophobic layer 190 formed over a passivation layer 160 in the reflective area. The hydrophobic layer 190 may be formed of a silicon based compound or a fluorine based compound.

Figure 11:
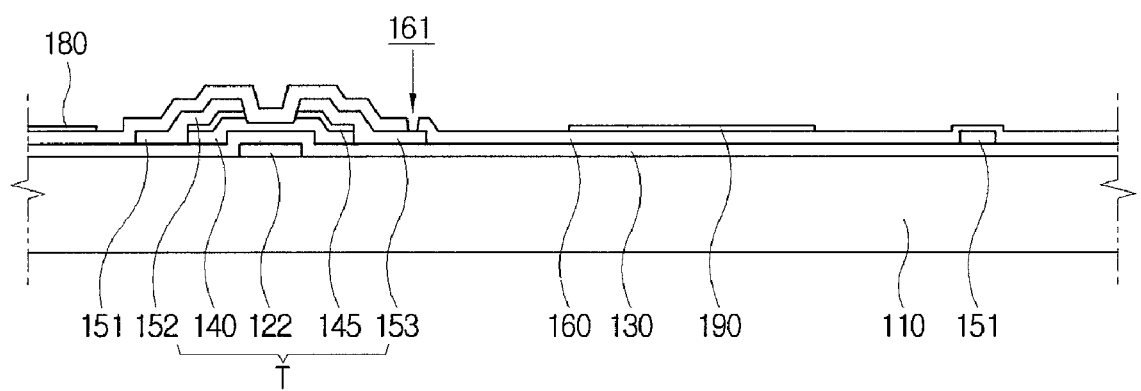
FIGS. 11 and 12 illustrate the manufacturing method of the liquid crystal display device according to the fourth embodiment of the present invention.

Referring to FIG. 11, the manufacturing method according to the fourth embodiment of the present invention is described. The hydrophobic layer 190 is formed over the passivation layer 160. The hydrophobic layer 190 is formed by depositing CF4 or a silane based compound on the passivation layer 160 by a plasma depositing method, and then patterning the layer 190 such that the layer 190 is removed everywhere except the reflective area. Alternatively, the hydrophobic layer 190 may be formed by a printing method.

Figure 12:
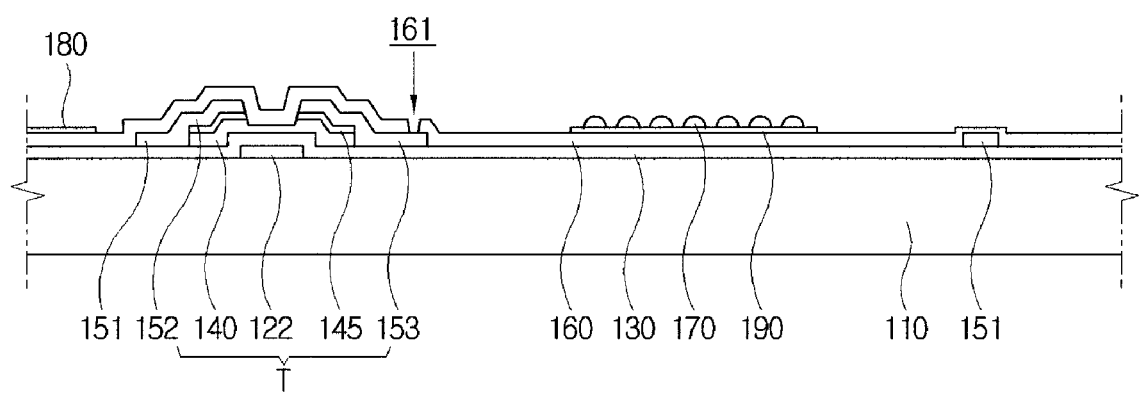

Then, referring to FIG. 12, a lens portion 170 is formed over the hydrophobic layer 190. Here, the lens portion 170 can be formed with a hemispheric shape as a result of a dewetting phenomenon.

In the case where a hydrophobic fluid composition is used, a hydrophilic material may be formed over the passivation layer 160 in the reflective area. As a result, the protrusions of the lens portion 170 can be provided with a hemispheric shape by the dewetting phenomenon. In this case, the hydrophobic layer 190 may be omitted. The lens portion 170 may be hydrophilic or hydrophobic material.

Hereinafter, a liquid crystal display device manufactured by a manufacturing method according to a fifth embodiment of the present invention will be described with reference to FIGS. 13 and 14.

Figure 13:
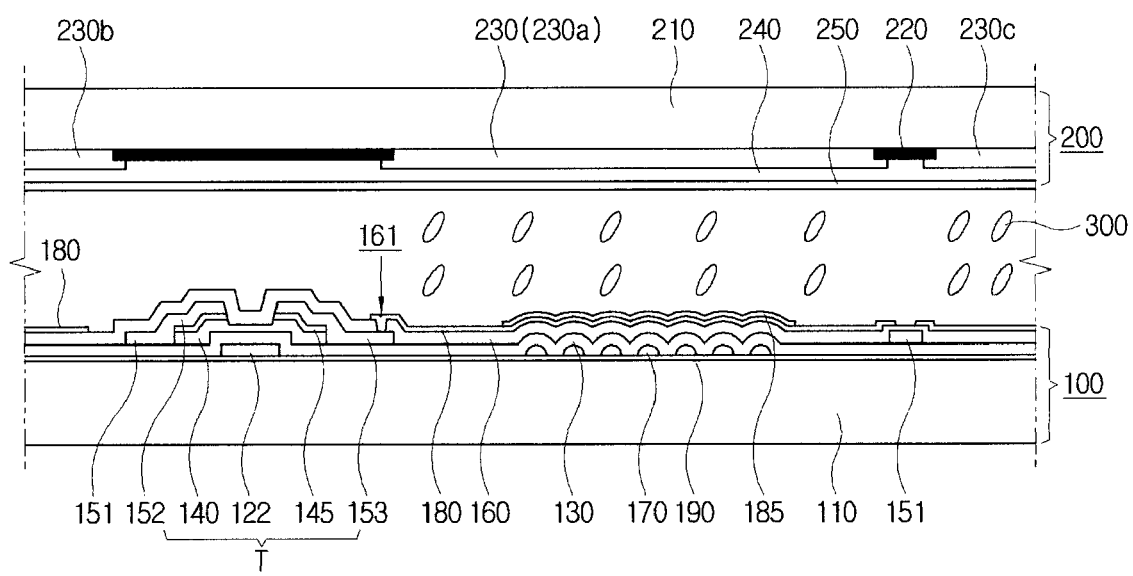
FIG. 13 is a sectional view of a liquid crystal display device manufactured by a manufacturing method according to a fifth embodiment of the present invention.

As shown in FIG. 13, a liquid crystal display device manufactured by a manufacturing method according to the fifth embodiment of the present invention includes a hydrophobic layer 190 contacting a first insulating substrate 110. A thin film transistor T and a lens portion 170 are formed over the hydrophobic layer 190. The hydrophobic layer 190 is formed over both the reflective area and the transmissive area without being patterned.

Figure 14:
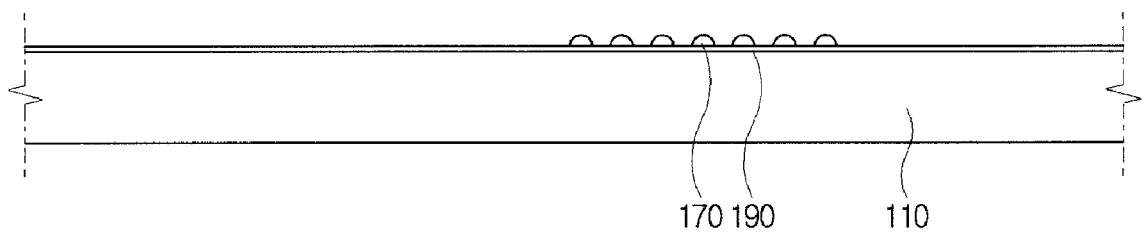
FIG. 14 illustrates the manufacturing method of the liquid crystal display device according to the fifth embodiment of the present invention.

Referring to FIG. 14, the manufacturing method according to the fifth embodiment of the present invention is described. The hydrophobic layer 190 is formed over the entire surface of the first insulating substrate 110, and the lens portion 170 is formed thereover. The protrusions of the lens portion 170 can be provided with a hemispheric shape as a result of the dewetting phenomenon caused by the deposition of the polarized fluid composition over the hydrophobic layer 190. The hydrophobic layer 190 may be formed by spin coating or slit coating.

Then, the thin film transistor T, a pixel electrode 180 and a reflective film 185 are formed over the hydrophobic layer 190.

Hereinafter, a liquid crystal display device manufactured by a manufacturing method according to a sixth embodiment of the present invention will be described with reference to FIG. 15.

Figure 15:
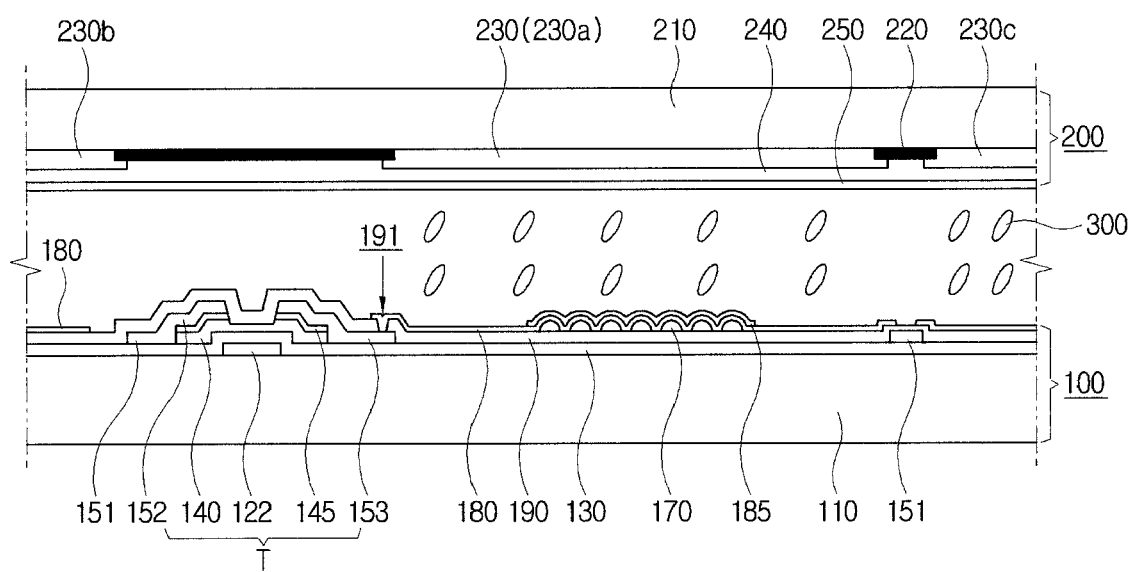
FIG. 15 is a sectional view of a liquid crystal display device manufactured by a manufacturing method according to a sixth embodiment of the present invention.

As shown in FIG. 15, a liquid crystal display device manufactured by a manufacturing method according to the sixth embodiment of the present invention is accomplished without a separate passivation layer 160. A hydrophobic layer 190 covers a thin film transistor T. The hydrophobic layer 190 is formed over both the reflective area and the transmissive area, and a contact hole 191 formed to expose a drain electrode 153.

Accordingly, the hydrophobic layer 190 can be used to replace the passivation layer 160, thereby simplifying the manufacturing process.

As described above, a manufacturing method of a display device according to the present invention can be used to simplify the manufacturing of a liquid crystal display device having a lens portion.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of manufacturing a liquid crystal display device, comprising:
    forming a lens portion on an insulating substrate, said forming comprising:
        depositing a first liquid composition on the insulating substrate to form a first plurality of protrusions;

hardening the first plurality of protrusions;
after hardening the first plurality of protrusions, depositing a second liquid composition on the insulating substrate to form a second plurality of protrusions, at least some of the protrusions of the second plurality of protrusions being deposited between protrusion in the first plurality of protrusions; and
hardening the second plurality of protrusions; and
forming a reflective film over the lens portion.

2. The method according to claim 1, wherein:
the first liquid composition and the second liquid composition each comprise a UV hardening resin;
the hardening the first plurality of protrusions comprises applying an ultraviolet ray to the first plurality of protrusions; and
the hardening the second plurality of protrusions comprises applying an ultraviolet ray to the second plurality of protrusions.

3. The method according to claim 1, further comprising:
forming a hydrophobic layer over the insulating substrate before forming the first plurality of protrusions;
wherein the lens portion is in direct contact with the hydrophobic layer and the hydrophobic layer comprises a silicon based compound.

4. The method according to claim 3, wherein the hydrophobic layer comprises a fluorine compound.

5. The method according to claim 1, wherein the protrusions in the first plurality of protrusions and the second plurality of protrusions are arranged in a plurality of rows.

6. The method according to claim 5, wherein each of the protrusions in the first plurality of protrusions and the second plurality of protrusions has a hemispheric shape.

7. The method according to claim 6, wherein:
the protrusions in the first plurality of protrusions are arranged in a first set of rows and a first set of columns; and
the second plurality of protrusions are aligned in a second set of rows and a second set of columns;
wherein the first set of columns is aligned with the second set of columns.

8. The method according to claim 6, wherein:
the protrusions in the first plurality of protrusions are arranged in a first set of rows and a first set of columns; and
the second plurality of protrusions are aligned in a second set of rows and a second set of columns;
wherein the first set of columns is offset from the second set of columns.

9. The method according to claim 1, wherein each of the protrusions in the first plurality of protrusions and the second plurality of protrusions has a linear shape.

10. The method according to claim 9, wherein a cross section of each linear protrusion is semicircular.

11. The method according to claim 1, wherein the first liquid composition and the second liquid composition have the same compositions.

12. A method of manufacturing a liquid crystal display device comprising:
depositing a first fluid composition on an insulating substrate using an inkjet deposition process to form a first lens sub-portion, said first fluid composition comprising a first liquid resin:
hardening the first lens sub-portion; after hardening the first lens sub-portion, depositing a second fluid composition
on the insulating substrate using an inkjet deposition process to form a second lens sub-portion, said second fluid composition comprising a second liquid resin;
hardening the second lens sub-portion to form a lens portion comprising the first lens sub-portion and the second lens sub-portion;
forming a reflective film over the lens portion; and
coupling the insulating substrate with a second insulating substrate with a liquid crystal layer therebetween.

13. The method according to claim 12, further comprising forming a hydrophobic layer before forming the lens portion.

14. The method according to claim 13, further comprising forming a switching element before forming the lens portion.

15. The method according to claim 14, further comprising forming a transparent conductive layer connected to the switching element.

16. The method according to claim 15, wherein the hydrophobic layer is formed before forming the switching element.

17. The method according to claim 15, wherein the hydrophobic layer is formed after forming the switching element.

18. The method according to claim 17, wherein the switching element comprises a source electrode and a drain electrode, and the source electrode and the drain electrode are contacted to the hydrophobic layer.

19. The method according to claim 18, wherein the liquid crystal display device comprises a reflective area and a transmissive area, the lens portion is formed in the reflective area and the hydrophobic layer is formed in the reflective area and the transmissive area.

20. The method according to claim 12, wherein: the first lens sub-portion comprises a first plurality of protrusions; and
the second lens sub-portion comprises a second plurality of protrusions interposed between the protrusions of the first plurality of protrusions.

* * * * *